C. H. Van Eps.
Sliding Gate.
Nº 63,444.  Patented Apr. 2, 1867.
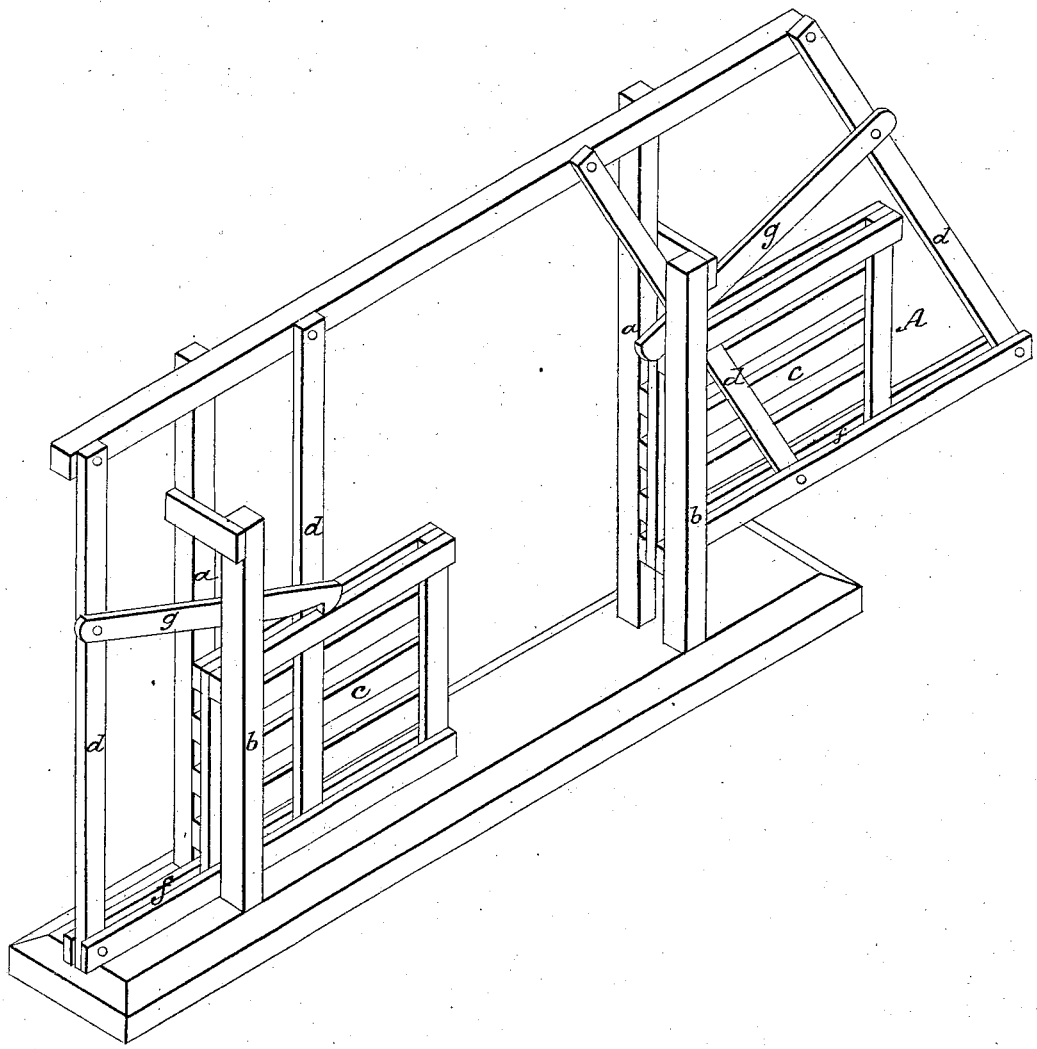
Witnesses.
G. W. Cater
H. H. Clark
Inventor.
C. H. Van Eps

United States Patent Office.

CHARLES H. VAN EPS, OF FARMINGTON, IOWA.

Letters Patent No. 63,444, dated April 2, 1867.

---

IMPROVEMENT IN GATES.

---

The Schedule referred to in these Letters Patent and making part of the same.

---

TO ALL WHOM IT MAY CONCERN:

Be it known that I, CHARLES H. VAN EPS, of Farmington, in the county of Cedar, and State of Iowa, have invented certain new and useful improvements in the Vibrating Gate; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

Figure 1 is an isometrical view of my invention.

Similar letters of reference indicate corresponding parts in the said figure.

$a$ the long post, $b$ the short post, $c$ the gates, $d$ the vibrating bars, secured to beam $e$, and bottom bar of gates $f$. $g$ is the latch secured to the outside vibrating bar, with bolts for the purpose of holding gates open, as shown at capital letter A. Each gate is hung upon two vibrating bars, which hang perpendicular when the gates are closed; and the gates, when they are to be opened, are raised up from the ground and swing or slide back by the side of the fence and parallel to it, and when back at a proper distance are caught by the catch in latch $g$. By raising said latch the weight of the gate closes it again.

What I claim as new, is—

The manner in which the gates $c$ are hung by the means of vibrating bars $d$ being attached to beam $e$ and bottom bar of gate $f$.

I also claim the latch $g$ for the purpose of holding the gate open as herein set forth.

Witnesses:
    G. W. CABLE,
    L. B. CLARK.

C. H. VAN EPS.